US010310519B2

(12) United States Patent
Medina

(10) Patent No.: US 10,310,519 B2
(45) Date of Patent: Jun. 4, 2019

(54) FLOWRATE CONTROL DEVICE FOR A FLUID

(71) Applicant: Böme S.r.l., Cavallirio (IT)

(72) Inventor: Carlo Medina, Cavalliro (IT)

(73) Assignee: Böme S.r.l. (IT)

( * ) Notice: Subject to any disclaimer, the term of this patent is extended or adjusted under 35 U.S.C. 154(b) by 67 days.

(21) Appl. No.: 15/521,929

(22) PCT Filed: Oct. 29, 2015

(86) PCT No.: PCT/EP2015/075167
§ 371 (c)(1),
(2) Date: Apr. 26, 2017

(87) PCT Pub. No.: WO2016/066765
PCT Pub. Date: May 6, 2016

(65) Prior Publication Data
US 2017/0315565 A1    Nov. 2, 2017

(30) Foreign Application Priority Data

Oct. 30, 2014    (IT) .............................. MI2014A1866

(51) Int. Cl.
G05D 7/01    (2006.01)

(52) U.S. Cl.
CPC ........... *G05D 7/014* (2013.01); *G05D 7/0133* (2013.01)

(58) Field of Classification Search
CPC .............................. G05D 7/014; G05D 7/0133
(Continued)

(56) References Cited

U.S. PATENT DOCUMENTS 3,073,350 A    1/1963  Dillman
3,156,262 A    11/1964 Attebo
(Continued)

FOREIGN PATENT DOCUMENTS

DE    2908881 A1    9/1980
GB    1418245       12/1975

*Primary Examiner* — Craig M Schneider
*Assistant Examiner* — David R Deal
(74) *Attorney, Agent, or Firm* — Laubscher & Laubscher, P.C.

(57) ABSTRACT

A flowrate control device for a fluid, includes a cartridge body defining a path for the fluid and having an upstream portion for the entry of the fluid, and a downstream portion provided with an outlet opening for the fluid. A shutter element is arranged in the cartridge body for sliding movement between an upstream end of the cartridge body corresponding to a minimum throttling position for the fluid and a downstream end of the cartridge body corresponding to a maximum throttling position for the fluid. The shutter element is provided with a throttling wall arranged downstream for throttling the outlet opening in a controlled manner and an upstream wall cooperating with the upstream portion of the cartridge body for bounding an inlet section for the fluid. A counter spring element exerts a contrasting force on the shutter element suitable for displacing the shutter element towards the upstream end. A section-varying assembly increases or decreases the area of the inlet section according to the variation of the contrasting force due to the movement of the shutter element along the longitudinal axis. The section-varying assembly, in addition to taking account the variable force of the counter spring element in order to ensure a constant flowrate, also minimizes the operating minimum pressure difference and controls the relation between the flowrate and the operating minimum pressure difference.

16 Claims, 12 Drawing Sheets

(58) Field of Classification Search
USPC .................................................. 138/43, 46
See application file for complete search history.

(56) References Cited

U.S. PATENT DOCUMENTS

| | | | | |
|---|---|---|---|---|
| 3,422,842 | A | | 1/1969 | Erickson |
| 3,765,447 | A | * | 10/1973 | Cornell .................. F16K 3/243 137/538 |
| 4,437,493 | A | * | 3/1984 | Okuda ................ G05D 7/0133 137/504 |
| 5,081,847 | A | * | 1/1992 | Anderson, Jr. ......... F25B 41/06 137/504 |
| 5,251,655 | A | * | 10/1993 | Low ........................ B67D 1/12 137/501 |
| 5,267,452 | A | * | 12/1993 | Zinsmeyer ............ F04D 29/063 137/538 |
| 6,042,015 | A | * | 3/2000 | Eveleigh .............. G05D 23/134 236/12.14 |
| 6,823,892 | B1 | * | 11/2004 | Knapp .................. F16K 15/026 137/512.2 |
| 7,503,341 | B1 | * | 3/2009 | Achterman ............ F16K 17/30 137/498 |
| 7,681,597 | B2 | * | 3/2010 | Knapp ................ G05D 7/0133 137/513.3 |
| 7,681,598 | B2 | * | 3/2010 | Knapp ................ F16K 15/026 137/513.3 |
| 7,980,265 | B2 | * | 7/2011 | Holmes .................. E21B 34/08 137/455 |
| 8,485,220 | B2 | * | 7/2013 | Riano Gutierrez .. G05D 7/0133 137/513.3 |
| 2009/0141584 | A1 | * | 6/2009 | Boer .................... B01F 3/0807 366/336 |

* cited by examiner

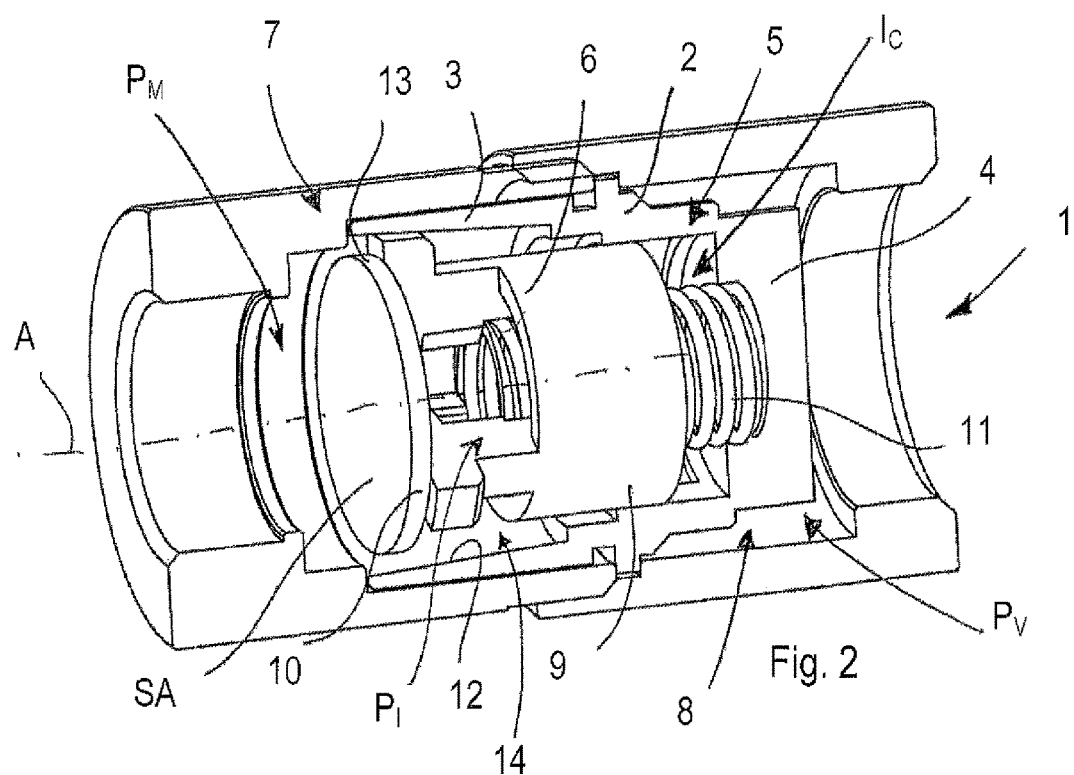
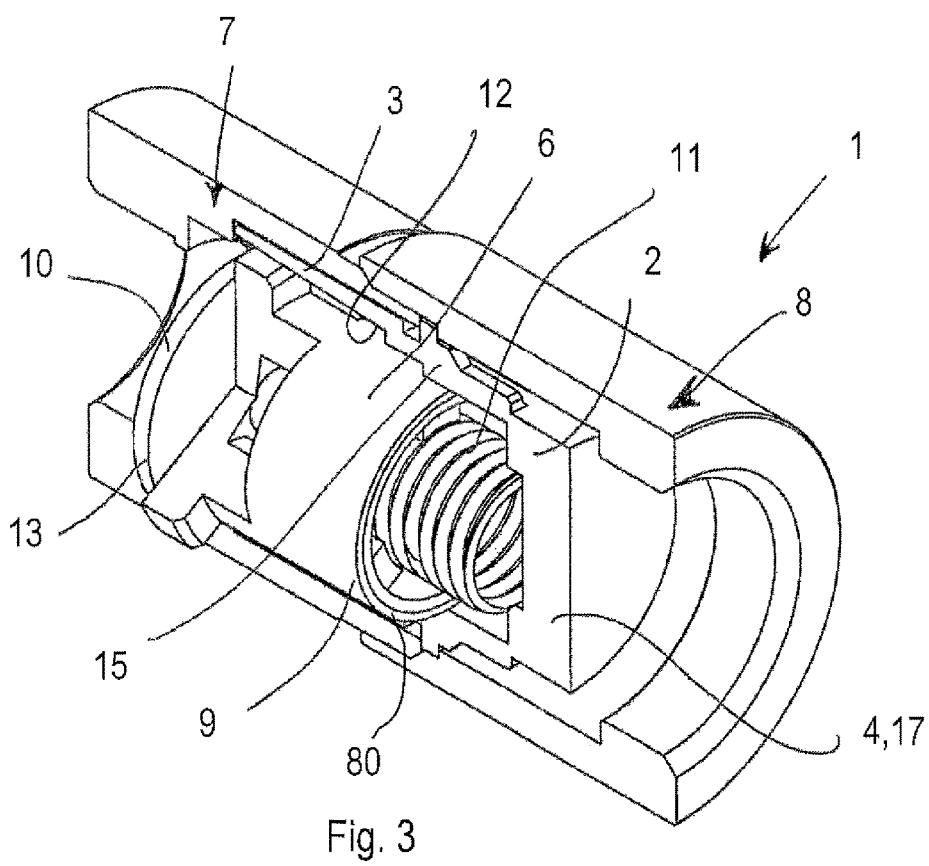

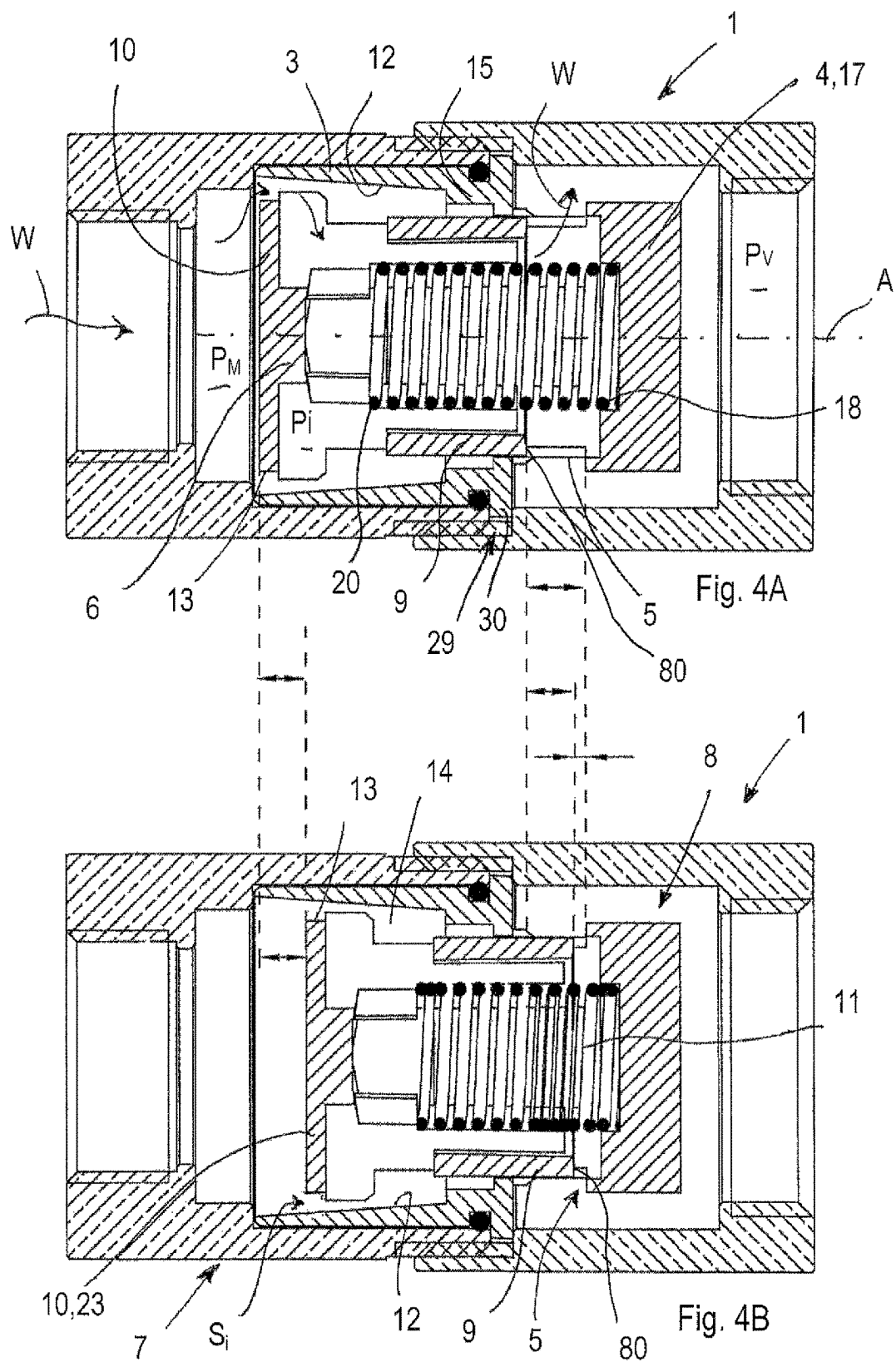

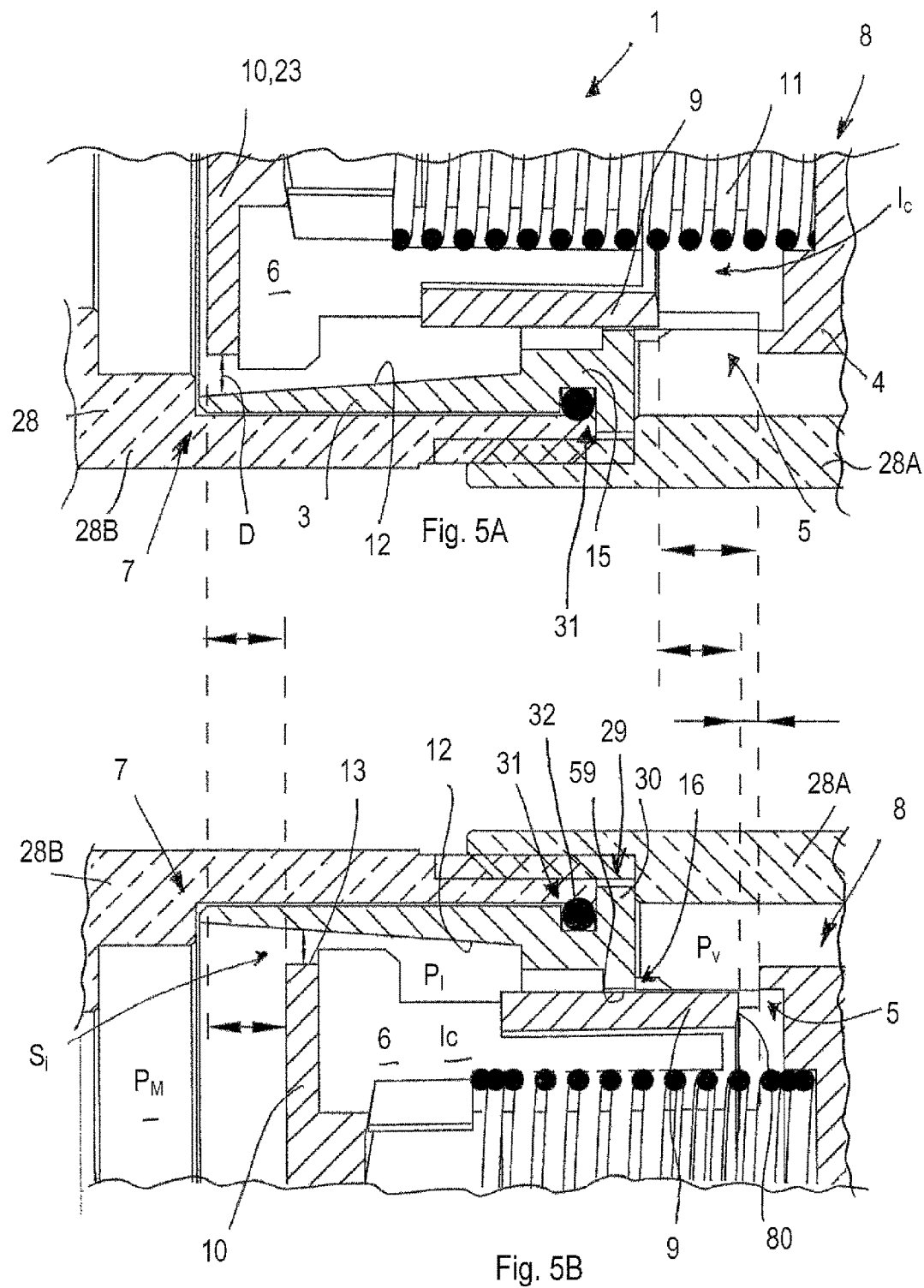

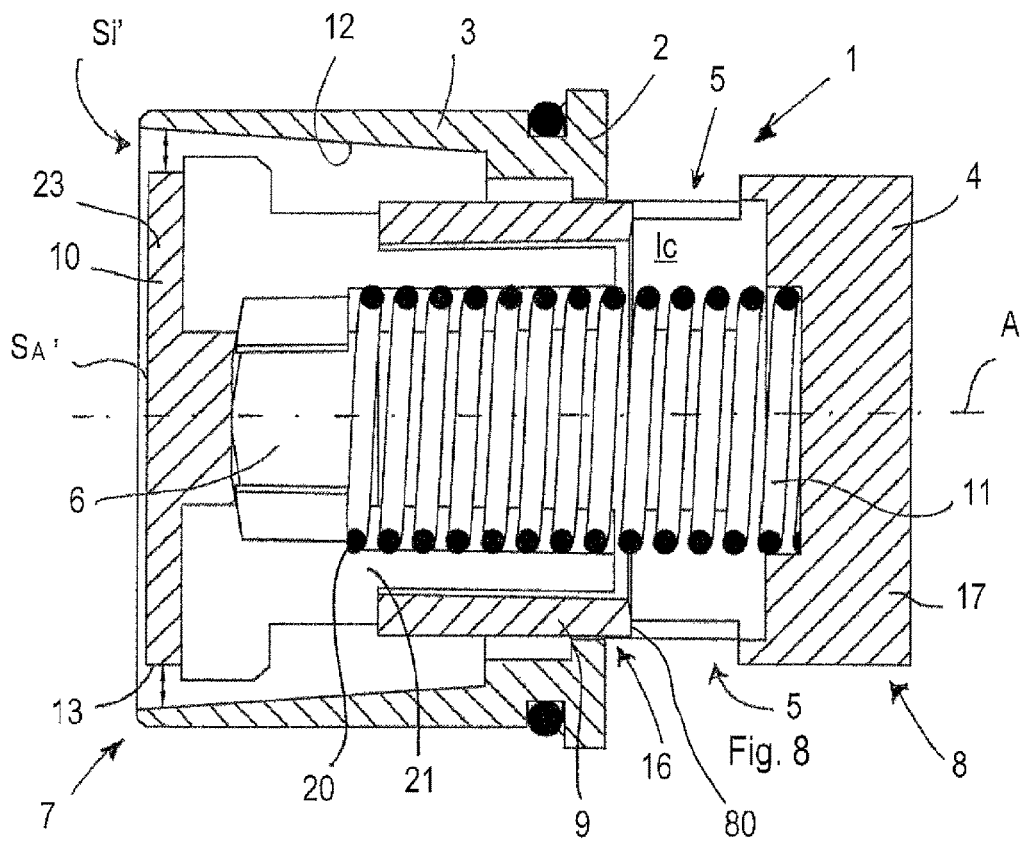
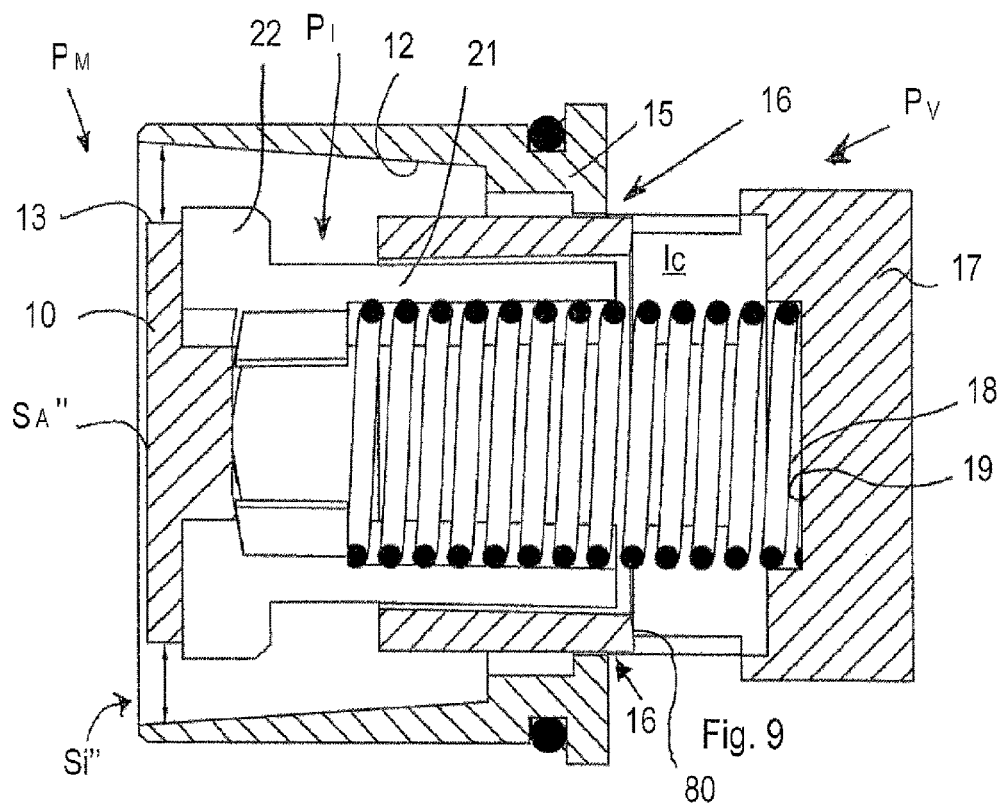

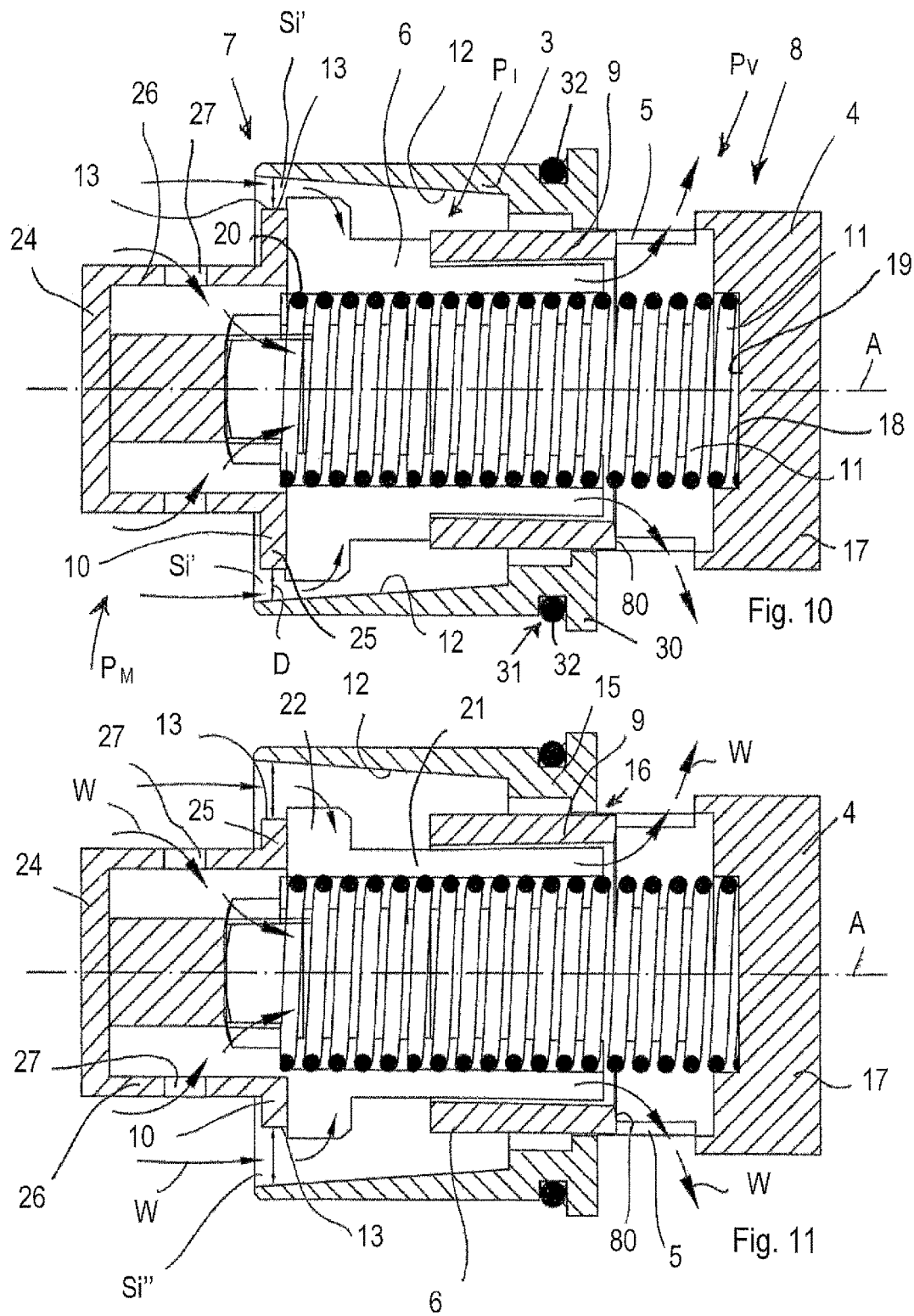

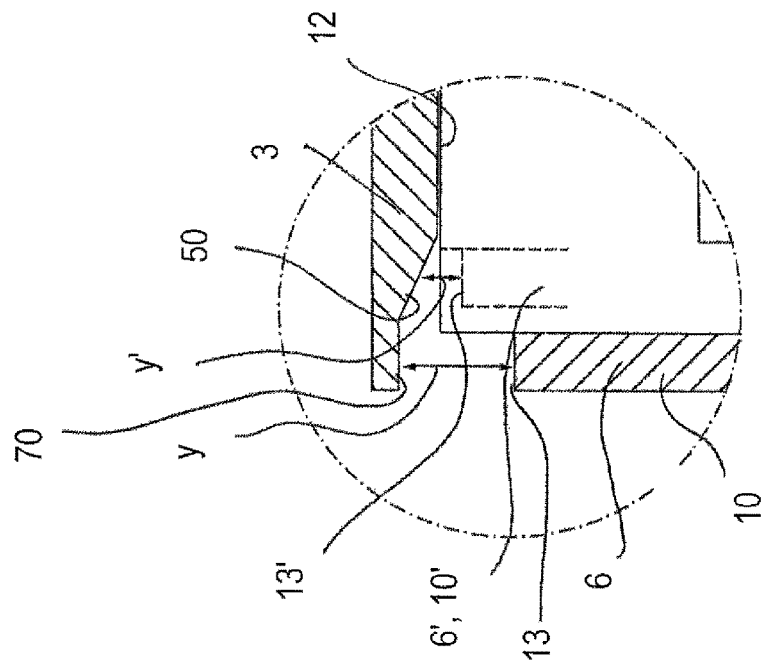
Fig. 14
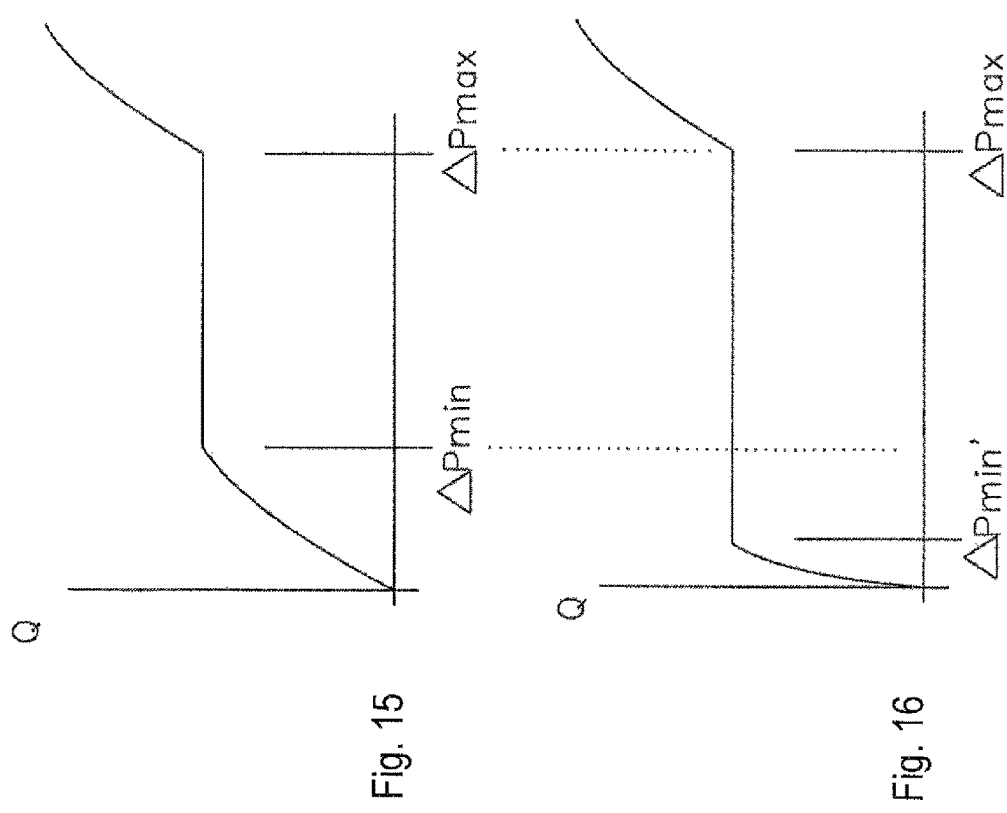
Fig. 15
Fig. 16

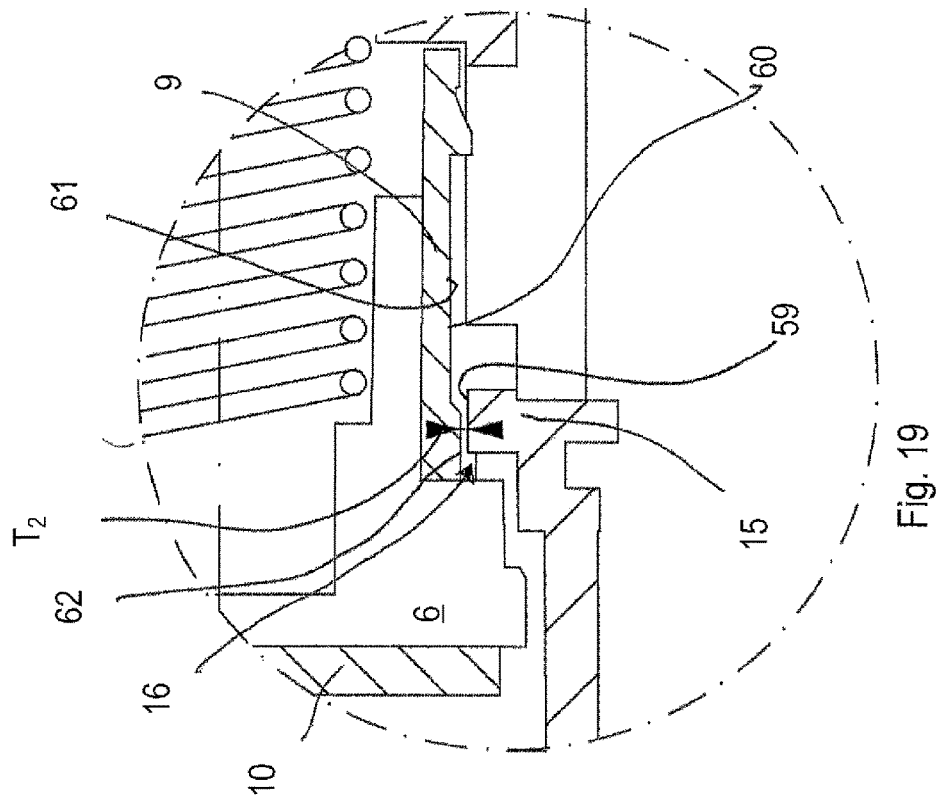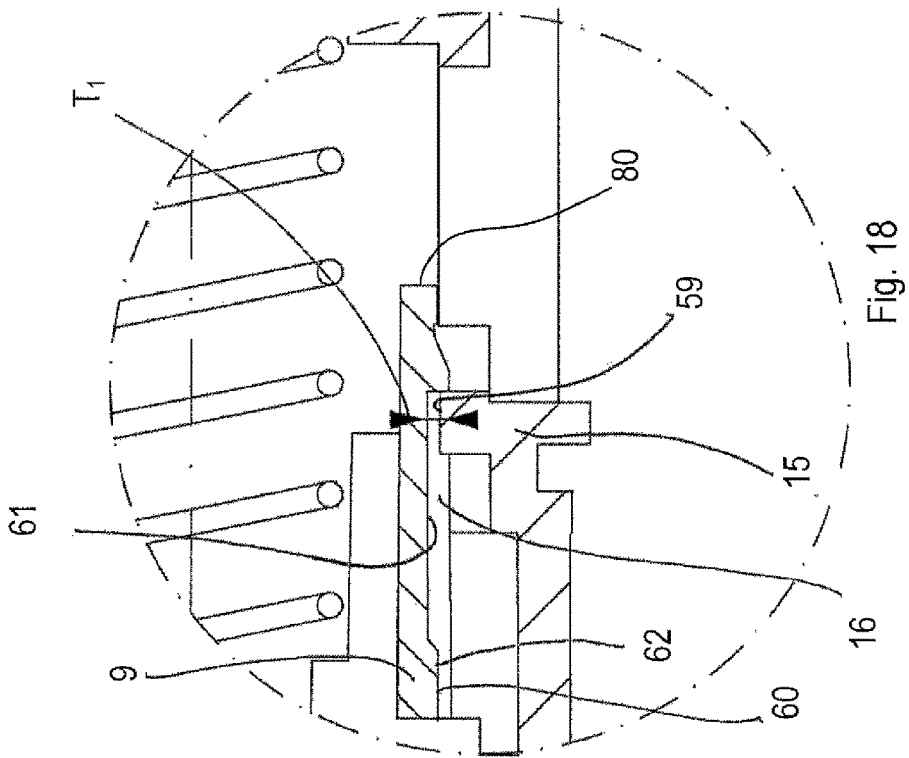

FLOWRATE CONTROL DEVICE FOR A FLUID

This application is a § 371 national phase entry of PCT International Application No. PCT/EP2015/075167 filed Oct. 29, 2015. PCT/EP2015/075167 claims priority to IT Application No. MI2014A001866 filed Oct. 30, 2014. The entire content of these applications is incorporated herein by reference.

BACKGROUND OF THE INVENTION

The present invention relates to a device for controlling and stabilising the flowrate of a fluid, in particular the flowrate of a liquid circulating in a circuit of residential or industrial type.

PRIOR ART

Valves are known that are fitted along a water circuit with the aim of maintaining the flowrate of water at a constant value despite possible variations in the pressure upstream and downstream of the valve, in order to ensure the same water supply to the various users.

One known type of valve for controlling the flowrate of water has an operating principle based on the maintenance, at a constant value, of the pressure difference between the pressure upstream of the valve, and the pressure of the liquid inside the valve, as disclosed better below.

In particular, a valve of this type comprises a stationary cartridge body inside which an adjusting element is longitudinally slidable in which an intermediate chamber for the advancing water is defined.

On an upstream wall of the adjusting element, located upstream of the advancement direction of the water in the valve, one or more openings are made for the entry of the water into the intermediate chamber.

The total area of the inlet section, consisting of one or more of the aforesaid openings, is maintained constant in any operating condition of the valve, this regardless of possible variations in the pressure value of the water upstream and/or downstream of the valve.

A downstream wall of the adjusting element throttles an outlet section for the water, obtained in a downstream zone of the cartridge body, in an amount that is variable according to the upstream pressure value of the liquid. Thus, whilst the area of the inlet section is always constant with the variation of operating conditions, the area of the outlet section is on the other hand variable and is reduced or increased by the adjusting element depending on the pressure variations upstream and/or downstream of the adjusting element.

A spring is provided that acts on the adjusting element to keep the outlet section open.

Between the adjusting element and the cartridge body a seal ring is provided that is arranged to prevent leaks of water into the gaps between the adjusting element and the internal surface of the cartridge body with respect to which the adjusting element is relatively slidable.

The internal pressure is linked directly to the upstream pressure by the adjusting element that is movable in the device.

The objective is to maintain the difference value constant between upstream pressure and internal pressure in order to maintain constant also the flowrate of the liquid.

During operation, if for example upstream pressure increases, the adjusting element is moved so as to compress the spring and throttle the outlet section more so that also the internal pressure in the intermediate chamber increases so as to re-establish the required pressure difference between the upstream zone and the intermediate chamber.

Similarly, if downstream pressure increases, the internal pressure in the intermediate chamber would also tend to increase but this is contrasted as follows: an increase of the downstream pressure is matched by an opening movement of the adjusting element that increases the area of the inlet section, reducing the internal pressure and re-establishing the correct difference between upstream pressure and intermediate chamber.

The seal ring between the adjusting element and cartridge body disclosed above is unfortunately a source of friction that adversely affects and delays the movement of the adjusting element and further reduces the sensitivity of the valve with negative effects on operating precision. Further, progressive wear of the seal ring due to the relative sliding between the adjusting element and the cartridge body leads to an inevitable loss of seal, with consequent leaks and thus a reduction in the operating efficacy of the valve.

Alternatively to the solution with seal ring that has just been disclosed, solutions have been proposed in which between the adjusting element and the cartridge body an impermeable elastic diaphragm is provided, such as, for example, disclosed in U.S. Pat. No. 3,422,842. Nevertheless, also this solution is not free of drawbacks: also in this case the forces that the diaphragm opposes to the movement of the adjuster are difficult to foresee and influence the precision and operating sensitivity of the valve. Further, fitting the diaphragm in the valve requires the presence of additional items such as ring nuts, stops, etc, with an increase in the associated costs and manufacturing complexity.

On the other hand, in order to dispense with seal rings and with impermeable elastic diaphragms, it would be necessary to provide, between the adjusting element and the cartridge body, minimum clearance, i.e. degrees of dimensional tolerance corresponding to costly and demanding high levels of machining precision. Further, the minimum clearance between adjusting element and cartridge body would also constitute a high risk of seizure due to the impurities or detritus inevitably present in the water in circulation.

All the currently known control valves are further unable to ensure constancy of the water flowrate value with the levels of precision that are today increasingly required. This is due to the fact that in the dimensioning of such valves it is assumed, with a certain approximation, that the preloading force exerted by the contrasting spring is constant during operation, i.e. it is considered that the spring always exerts a set value regardless of the degree of compression to which it is subjected.

In reality, the force exerted by the spring increases proportionally to the degree of compression sustained by the spring because of the pressure of the water.

The result of this approximation is that with the growth of the upstream pressure, there is a growth of the difference value between upstream pressure and internal pressure and, as shown in the dashed line in the diagram in FIG. 7, an increase, albeit moderate, occurs in the flowrate value, rather than having, as would be desirable, perfect constancy in the desired flowrate.

A flow-control-valve is known from U.S. Pat. No. 3,156,262, comprising an elongated valve-case a first part of which defines a cylinder sleeve conformed for housing an axially shiftable valve-body, or plug, for controlling the flowrate of the fluid. A second part of the elongated valve-case protrudes further for internally housing a contrast-spring for such a valve-body. The contrast-spring is placed outside the plug and axially aligned therewith, and exerts a compression force on a downstream-end of the plug. As the contrast-spring is necessarily placed outside the valve-body, the longitudinal length of the elongated valve-case is very relevant, thus making this flow-control valve rather cumbersome.

The cylinder sleeve comprises an axial inlet and a radial outlet for the fluid.

The radial outlet of the cylinder sleeve faces the external surface of the plug; therefore the radial outlet is in a zone whose longitudinal position is interposed between the upstream end and the downstream end of the plug itself.

The movable valve-body comprises an upstream flange defining together with the cylinder sleeve an upstream passage section. The valve-body has an elongated shape and is internally hollow so as to provide an internal axial passage for a branch of the fluid-flow.

The flow-control-valve is configured so that the entering fluid splits up in two flow branches: a first flow branch runs outside and around the plug, along a gap defined between the plug and the cylinder sleeve, whereas a second flow branch runs longitudinally inside the plug along the internal axial passage thereof and exits the plug through the downstream-end of the latter. The two distinct flow branches meet again shortly before reaching the radial outlet. Due to the configuration of the radial outlet whose longitudinal position is interposed between the upstream end and the downstream end of the plug, evidently the two flow branches, at the end of their respective paths within the cylinder-sleeve, meet again according to opposing advance directions and collide against one other, thus causing a perturbation in the advancing of the fluid which is source of undesired mechanical vibrations.

The internal surface of the cylinder-sleeve is subdivided in three surfaces by two separated circular grooves: there are defined a first upstream surface, an intermediate cylindrical surface and a downstream cylindrical surface.

The plug comprises, in sequence: the upstream flange, a reduced portion, a first enlarged cylindrical portion, a first reduced conical portion, a second enlarged cylindrical portion and a second reduced conical portion abutting on the contrast spring. The first enlarged cylindrical portion cooperates with the intermediate cylindrical surface for defining a first throttling-passage gap for the first flow branch of the fluid. The second enlarged cylindrical portion cooperates with the downstream cylindrical surface of the cylinder-sleeve for defining a second throttling-passage gap for the second flow branch of the fluid.

The axial position of the plug within the cylinder-sleeve depends on the upstream pressure of the fluid. When the upstream pressure of the fluid is low, the compression-spring is extended and the plug is positioned so that the first reduced conical portion and the second reduced conical portion face respectively the intermediate cylindrical surface and the downstream cylindrical surface of the cylinder-sleeve: in this operative condition the two throttling-passage gaps for the respective flow branches oppose less resistance to the advancing fluid. When the upstream pressure of the fluid is higher, the plug is pushed against the opposing spring and the first and second enlarged cylindrical portions of the plug face, by a greater extent, the intermediate cylindrical surface and the downstream cylindrical surface respectively. In this configuration, the two throttling-passage gaps oppose more resistance to the two branches of advancing fluid with the purpose to establish a state of equilibrium. Therefore, the fluid (more precisely, the two flow branches of fluid) is obliged to run through the two above mentioned throttling passage-gaps before reaching the radial-outlets and leaving the valve; in other words, according to the advancement-path of the fluid, an upstream throttling-action of the fluid occurs, namely upstream of the radial outlets. This structural and functional configuration, disadvantageously, entails a high risk of seizure due possible dirt and detritus dragged by the fluid which is obliged to run along the elongated and narrow throttling-passage-gaps which are interposed between the cylinder sleeve and the plug, before arriving at the outlet.

From what has been described, it is evident that the valve of U.S. Pat. No. 3,156,262 is geometrically rather complicated and bulky and not free from seizure risks. It would be desirable to provide a solution structurally simplified, having a more effective and precise functioning, and able to noticeably reduce any risks of seizures as well.

OBJECTS OF THE INVENTION

The object of the present invention is to improve prior-art flowrate control valves and provide a solution that is able to overcome the drawbacks inherent in known valves.

In particular, one object of the invention is to provide a flowrate control device that is provided with greater effectiveness, reliability and operating precision.

Another object of the invention is to provide a flowrate control device that in addition to being precise, reliable and durable, is also structurally simplified and cheap to build.

BRIEF DESCRIPTION OF THE INVENTION

The above is achievable by means of a flowrate-control device according to what is defined in 1.

In particular, the section-varying arrangement or assembly is configured for reducing the area of said inlet section with the increase of the value of said contrasting force and for minimising the operating minimum pressure difference so as to make the device more effective, reactive and sensitive in the action of controlling the flowrate at a desired value.

The section-varying assembly, in particular, comprises an adjusting surface that is tilted with respect to said longitudinal axis.

In particular, the adjusting surface is a converging-lying surface, that extends around the longitudinal axis in a convergent manner downstream of the advancement direction of the fluid.

In one embodiment, said adjusting surface comprises a conical adjusting surface.

According to a still further embodiment, the adjusting surface comprises, near a zone further upstream, a portion having a degree of convergence that is greater than the remaining convergent part downstream. Owing to this configuration, the efficiency and sensitivity of the device is improved further, which in particular is able to ensure the desired flowrate constancy at the required level at operating minimum pressure difference values (pressure difference between upstream zone and zone inside the device) that are much lower than with prior-art devices.

Owing to the invention, the aforesaid drawbacks are overcome.

BRIEF DESCRIPTION OF THE DRAWINGS

The invention will be able to be understood and implemented better with reference to the attached drawings, which illustrate some embodiments thereof by way of non-limiting example, in which:

FIGS. 2 and 3 are two different cutaway perspective views of the device according to the invention in which a shutter element housed inside a cartridge body of the device is visible;

FIGS. 4A and 4B show one embodiment of the device with the shutter element respectively in a minimum throttling position and in a greater throttling position;

FIGS. 5A and 5B are enlarged details of respectively FIGS. 4A and 4B;

FIGS. 8 and 11 show the device according to the invention in different possible embodiments of geometrical configurations which are suitable for different ranges of use, in particular optimised for increasing nominal flowrates, starting respectively from a smaller nominal flowrate value in the case of the device in FIG. 8, and arriving at a larger nominal flowrate value in the case of the device in FIG. 11;

FIG. 14 is a view like that of FIG. 13, which shows partially with a dashed line another shutter element, which is positioned differently, and is suitable for operating with a nominal flow rate that is less than the shutter element shown by a continuous line;

FIGS. 15 and 16 are diagrams in which the operation of the device according to the versions in FIGS. 1 to 8 is compared with that of the device according to the version shown in FIGS. 12 and 13;

FIG. 18 is an enlarged detail of FIG. 12 in which the profile of a throttling wall of the shutter element included in the device is more visible;

FIG. 19 is like FIG. 18 but with the throttling wall in a closed position.

DETAILED DESCRIPTION OF THE INVENTION

Figure 1:
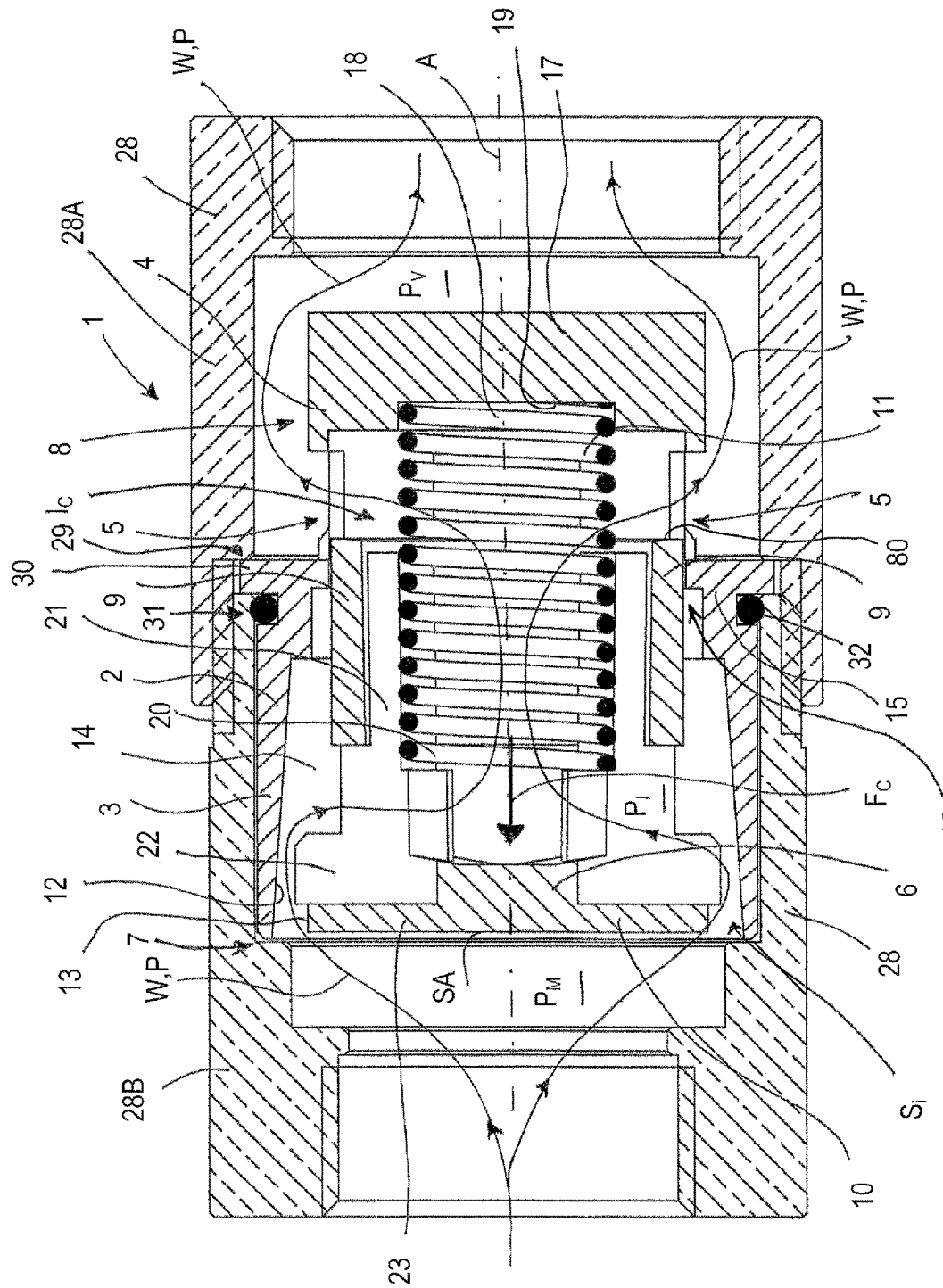
FIG. 1 is a longitudinal section of a flowrate-control device according to the invention.
Figure 6:
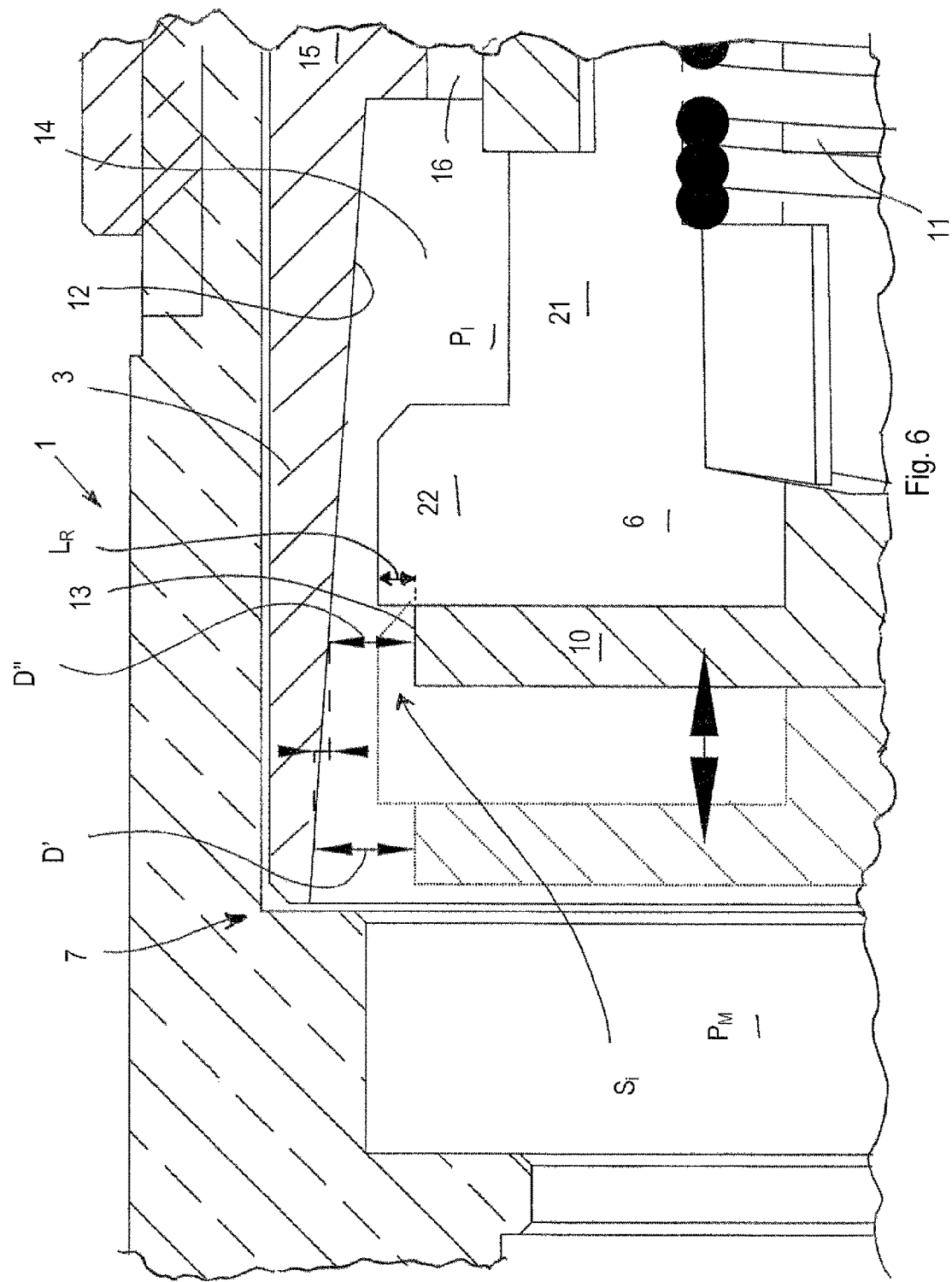
FIG. 6 is an enlarged detail of FIG. 5B in which the two different throttling positions can be compared, which are shown in FIGS. 4A and 4B, which are reached by the shutter element.

With reference to the enclosed Figures a flowrate-control device 1 is shown for controlling and stabilising the flowrate of a fluid, in particular for controlling and stabilising the flowrate of a liquid, such as water, circulating in a circuit of residential or industrial type.

A first example of an application in which the efficacy of action of the device 1 in question is clear is given by fitting such a device 1 in a water circuit in a building of several floors: if in the lower floors all the water connections are opened simultaneously, the higher floors suffer from a reduced or even no supply of water. By installing the device upstream of each water connection a constant flowrate will be guaranteed that is the same for all water connections.

In a second example, if several water connections are connected to a main network, the flowrate to each water connection will vary according to how many other water connections are open. Also in this case installing the device upstream of each water connection will guarantee a constant flowrate. The device 1 according to the present invention is now disclosed in detail.

The device 1 comprises a cartridge body 2 that defines internally a path P for the fluid and has an upstream portion 3, for the entry of the fluid W, and a downstream portion 4 provided with an outlet opening 5 for this fluid W.

The device 1 comprises a shutter element 6 housed slidingly along a longitudinal axis A in the cartridge body 2.

The shutter element 6 is movable between an upstream end 7 of the cartridge body 2, to which a minimum throttling position for the fluid W corresponds, and a downstream end 8 of the cartridge body 2, to which a maximum throttling position for the fluid W corresponds.

The shutter element 6, in a zone that is further downstream according to the advancement direction of the fluid W, is provided with a throttling wall 9 arranged for throttling in a controlled manner the outlet opening 5.

The shutter element 6, in a zone that is further upstream according to the advancement direction of the fluid W, is provided with an upstream wall 10 cooperating with the aforesaid upstream portion 3 of the cartridge body 2 for bounding an inlet section Si for the fluid W.

In particular, the upstream wall 10 comprises a blind disc wall 23.

In the device 1 a counter spring element 11 is included that is suitable for exerting a contrasting force $F_C$ intended to arrange the shutter element 6 towards the upstream end 7.

In particular, the spring element includes a compression spring 11, as disclosed further below, that acts to push the shutter element 6 to the end of the device 1 in which the entry for the fluid W is provided.

The section-varying assembly 12 enables the area of the inlet section Si to be increased or decreased according to the variation of the contrasting force FC due to the movement of the shutter element 6 along the longitudinal axis A. The section-varying assembly 12 is configured for reducing the area of the inlet section Si as the value of the contrasting force $F_C$ increases.

The section-varying assembly includes an adjusting surface 12 that is tilted with respect to the longitudinal axis A.

The adjusting surface 12 is obtained on the upstream portion 3 of the cartridge body 2.

The adjusting surface 12 has a converging-lying surface, i.e. it extends around the longitudinal axis L and has a profile converging towards the downstream end 8.

More specifically, in the embodiment shown in the attached Figures, the adjusting surface comprises a conical adjusting surface 12 having an internal diameter that decreases progressively according to the advancement direction of the fluid W.

The function of the section-varying assembly 12, in particular the convergent adjusting surface 12, which in the disclosed and shown embodiment is a conical adjusting surface 12, is thus to vary the entry area that the fluid traverses to enter an internal or intermediate chamber $I_C$ of the device 1.

As will become clearer from the following description, owing to this function a particularly constant value of the flowrate Q is assured, unlike known values in which this result is not achieved because no proper allowances are made not only for the actual performance of the counter spring, particularly the inconstant performance thereof, but also no allowances are made for the force, which is difficult to calculate, exerted by the elastic diaphragms included in prior-art devices.

From detailed calculations and numerous laboratory tests it has emerged that excellent operating results of the device 1, and maximum flowrate control and stabilisation efficacy are obtained with conicity values comprised between a few tenths of a degree and a few degree units, depending on the specific dimensional and geometrical dimensions adopted each time, on the mechanical and geometrical features of the counter spring and on other factors.

The conical adjusting surface 12 is obtained on the aforesaid upstream portion 10 of the cartridge body 2.

On the upstream wall 10 of the shutter element 6 a lateral bounding surface 13 is obtained, the distance D of which from the conical adjusting surface 12 varies according to the position of the shutter element 6 along the longitudinal axis A. In particular, in the minimum throttling position the distance D between the lateral bounding surface 13 and the conical adjusting surface 12, is at a maximum value.

When the shutter element 6 moves along the longitudinal axis A to work against the force $F_C$ of the spring, the distance D is reduced progressively.

In the maximum throttling position, the distance D has a minimum value.

The distance D is chosen suitably on the basis of the nominal flowrate values for the circuits on which the device 1 is intended to be fitted.

In other words, for different water flowrate values to be controlled, different respective geometries can be provided. For the same dimensions of the device 1 greater distance values D will be obtained for higher nominal flowrate values.

For example, in the range of use with low water flowrate values, comprised between 1 and 20 [l/min], the device 1 can be sized from a specific basic geometrical configuration, corresponding to use with a flowrate equal to 1 [l/min].

For flowrates above 1 [l/min], for example equal to 2 [l/min], 3 [l/min] and so on, an upstream wall 10 will be supplied that is provided with a surface $S_A$ that is smaller and smaller each time, so as to define an inlet section Si that grows progressively for the liquid W.

For still greater flowrates, a greater size of the device 1 will be used, with a respective basic geometrical configuration, and similarly to what has been disclosed above, extensions of the surface $S_A$ of the upstream wall 10 will be provided that are increasingly smaller to adapt each time to increasing nominal flowrate values.

In FIGS. 8 and 9 two different possible geometrical configurations for the device 1 are shown by way of non-limiting example: with the same general dimensions of the device 1, the embodiment in FIG. 9 has, on the upstream part 10, a surface $S_A''$ that is less than the surface $S_A'$ in FIG. 8.

The inlet section Si'' in the embodiment in FIG. 9 is greater than the inlet section Si' in the embodiment of FIG. 8, to adapt to use with a higher nominal water flowrate value.

The conical adjusting surface 12 bounds in the cartridge body 2 a frustoconical chamber 14 converging in the advancement direction of the fluid W, i.e. converging towards the downstream end 8.

In other words, the frustoconical chamber 14 has a cross section that from a maximum value, nearer the upstream end 7, decreases progressively as it approaches the downstream end 8.

The cartridge body 2 comprises an intermediate portion 15, interposed between the upstream portion 3 and the downstream portion 4 of the cartridge body 2, and slidably housing the throttling wall 9 of the shutter element 6. The intermediate portion 15 comprises an internal surface 59, whereas the throttling wall 9 is bounded externally by a control surface 60. Between the intermediate portion 15 and the throttling wall 9 a gap 16 of variable size is defined for the passage of a certain quantity of fluid W.

More precisely, the control surface 60 comprises a first zone 61 and a second zone 62 having respective external diameters that are different from one another. In particular, the second zone 62 is located upstream of the first zone 61 and has an outer diameter that is greater than the latter. When the first zone 61 faces the internal surface 59 of the intermediate portion 15, the gap 16 assumes a size T1. On the other hand, when the second zone 62 faces the aforesaid internal surface 59, the gap 16 assumes a further size T2, which is less than the size T1, which reduces in a controlled manner the passage of fluid towards the outlet. In other words, during operation in normal operating conditions in which there is the distance/size T1 between the internal surface 59 and the first zone 61, the gap 16 is sufficient to prevent seizing phenomena. In the configuration with size T2, when also the outlet openings 5 start to be significantly obstructed, the leak section of the fluid W through the gap 16 is also reduced, nevertheless leaving a minimum passage section open. The gap 16 thus not only performs a flowrate-control action, but also a damping action in the event of excessive overpressure, preventing fluid-hammer phenomena and providing a vibration-damping action. The gap 16 thus cooperates in a certain manner also with the section-varying assembly 12 in the action of controlling the flowrate of the outgoing fluid W.

The gap 16 acts as a "safety passage" for the fluid if in the event of sudden excessive overpressure upstream there is a momentaneous total closure of the outlet opening 5. The gap 16 performs a damping action to prevent water-hammer phenomena and a damping of the vibrations that would be generated because of a pulsating or irregular pressure pattern.

It is thus also owing to the gap 16 that the device 1 is able to stabilise the flowrate, avoiding oscillations of the value that would be generated because of irregularities and pressure peaks.

The variable width of the gap 16 is chosen carefully, it is thus not only a simple mechanical clearance inherent in the slidable coupling between shutter element 6 and cartridge body. The size of the gap 16 is chosen carefully, also taking account of the inlet section and/or of other geometrical parameters, to fulfil also the functions that have just been described above of damping and attenuating pressure hammers and of damping vibrations in the fluid.

The aforesaid configuration with the gap 16 between the shutter element 6 and the cartridge body 2 brings the advantage, in addition to preventing the risk of undesired seizing because of interposed impurities, of not requiring further degrees of dimensional tolerance corresponding to costly and demanding levels of machining precision, as on the other hand occurs in prior-art valves in which minimum clearance is required between the movable element and cartridge body or, otherwise elastic diaphragms or seal rings that are interposed between the movable element and the cartridge body, with the drawbacks illustrated above.

Owing to the aforesaid configuration of the device 1 of the invention, during manufacture, it is sufficient, for coupling of the shutter element 6 with the cartridge body 2, to perform machining of suitable quality and precision, but not exaggerated as in the case of the known valves disclosed previously, for the reasons set out above.

In other words, in the device 1 according to the invention, it is the liquid inlet zone, defined between the upstream wall 10 and the upstream portion 3 of the cartridge body 2, that acts as an adjusting section of the flowrate, unlike some prior-art valves in which this inlet zone constitutes a problem to be managed with seal rings of the O-ring type or elastic diaphragms. Further, as the inlet section Si in the device 1 according to the present invention is of a significant amount, ample clearance between the shutter element 6 and the cartridge body 2 is ensured, the problem of the seizing risk is eliminated that is causable by impurities that are inevitably present in the circuit.

Compared with known devices, the greater structural simplicity of the device 1 according to the invention is evident, which has a smaller number of components than the large number of assembled parts found in prior-art devices.

The outlet opening 5, in particular, comprises one or more radial outlet openings 5 obtained on the downstream portion 4. This arrangement, advantageously, enables the fluid W to exit the cartridge body 2 radially in a distributed manner. The downstream portion 4 includes a blind bottom wall 17 arranged transversely to the longitudinal axis A and facing the upstream wall 10 of the shutter element 6. The blind bottom wall 17 faces a downstream-edge 80 of the throttling wall 9. The outlet opening 5 results defined between the throttling wall 9 and the blind bottom wall 17 and is thus longitudinally positioned downstream of the shutter-element 6.

The bottom wall 17, the upstream wall 10 and the throttling wall 9 of the shutter element 6 together bound the intermediate chamber $I_C$ arranged for being traversed by the fluid W at an intermediate pressure $P_I$ between an upper pressure $P_M$ present upstream of the shutter element 6, and a lower pressure $P_V$ downstream of the shutter element 6. The shutter element 6 and the cartridge body 2 are structurally configured to force the entering fluid W to flow into the shutter-element 6, along the path P. Therefore, the fluid W substantially runs along a single path P through the internal cavity of the shutter element 6. This configuration advantageously enables the fluid-perturbations to be reduced compared to some prior art devices in which the fluid splits up in more flow-branches which meet again at the outlet according to opposing directions with a turbulent collision which is source of undesired mechanical vibrations. The above described structural and functional configuration entails also a further advantage over the prior art devices, in particular over the device of U.S. Pat. No. 3,156,262 above discussed: in the flowrate-control device 1 according to the present invention the substantial throttling action of the fluid takes places downstream of the shutter-element 6—according to the advancement-path of the fluid—namely at the outlet opening 5 in which, what's more, such a downstream throttling action is achieved by shutting a section area of the outlet opening 5 transversely to the radially outgoing fluid leaving the cartridge-body 2, and not by forcing the fluid to run along elongated and narrow cylindrical throttling-gaps placed upstream of the outlet as occurs in the device of U.S. Pat. No. 3,156,262 (in which a higher risk of seizure is envisaged). The fact that the throttling zone, in the present device 1, is placed downstream of the shutter-element 6, implies a noticeably reduced risk of seizure caused by possible detritus getting stuck between the shutter element 6 and the cartridge body 2.

The flow-control-device 1, operating with a downstream throttling-action, (differently from the device of U.S. Pat. No. 3,156,262 which operates with an upstream throttling-action), therefore proves to be more reliable and free from seizure risks compared to the prior art devices.

The counter spring 11 is housed in the aforesaid intermediate chamber $I_C$ and has a first end 18 housed in a seat 19 obtained on the bottom wall 17 of the cartridge body 2, and a second end 20 arranged for acting on an inner zone of the upstream wall 10 of the shutter element 6. Such a configuration advantageously implies a reduced longitudinal dimension of the flowrate-control device 1.

The shutter element 6 comprises one or more longitudinal ribs 21 that connect the upstream wall 10 to the throttling wall 9. Each of the longitudinal ribs 21 includes, near the upstream wall 10, a head part 22 of larger dimensions, i.e. a widening, that gives the shutter element 6 greater stiffness and strength. The head parts 22 radially protrude beyond the upstream wall 10 by an amount $L_R$. The so configured longitudinal ribs 21 act as elements for guiding and maintaining in a correct position the shutter element 6.

The device 1 further comprises a housing body 28 for the cartridge body 2.

The housing body 28 includes a first housing element 28A and a second housing element 28B which are mutually couplable in a releasable manner.

In particular, the first housing element 28A and the second housing element 28B are couplable by a threaded coupling.

The first 28A and the second 28B housing elements define, in a coupled configuration, a clamping seat 29 that firmly houses a flange portion 30 of the cartridge body 2.

The coupling type between the housing elements 28A and 28B and the geometrical configuration of the housing body 28 have been disclosed above merely by way of non-limiting example. Other embodiments are therefore possible that are chosen case by case according to specific assembly needs.

On the cartridge body 2, upstream of the aforesaid flange portion 30, annular seat 31 is obtained housing seal ring 32 to prevent leaks of fluid between the cartridge body 2 and the housing body 28.

The operation of the device 1 according to the invention is disclosed below.

The operating principle is based on the relationship between the upstream upper pressure $P_M$ and the internal pressure $P_I$: maintaining the difference between the upstream upper pressure $P_M$ and internal pressure $P_I$ constant:

$$\Delta P = P_M - P_I = \text{const}$$

A constant flowrate Q is obtained.

Similarly, the same operation can be obtained by stabilising the constancy of the difference between the internal pressure $P_I$ and the downstream pressure $P_V$.

With the varying of the $P_M$ also the internal pressure $P_I$ varies and the force $F_C$ that the spring 11 exerts on the shutter element 6 will be such as to fulfil the equation:

$$P_M S_A = P_I (S_{INT}) + F_C$$

where $S_{INT}$ is the set of the internal surfaces of the shutter 6 on which the internal pressure $P_I$ of the liquid generates a resulting force that is parallel to the longitudinal axis A and is directed towards the upstream end 7, i.e. directed like the force $F_C$ of the spring 11.

As:

$$S_A = S_{INT}$$

the following relations apply:

$$P_M S_A = P_I S_A + F_C$$

$$P_M S_A - P_I S_A = F_C$$

$$\Delta P = P_M - P_I = F_C / S_A = \text{CONST*} \quad (1)$$

Consequently, if the upstream pressure $P_M$ increases, the shutter element 6 moves to compress the spring 11 to the downstream end 8, reducing the area of the outlet section 5 and consequently increasing the internal pressure $P_I$ so that the relation (1) indicated above is fulfilled.

If $P_M$ decreases, the shutter element 6 moves towards the upstream end 7, under the effect of the contrasting force $F_C$ of the spring 11 that thus expands. In this manner, the area of the section or outlet opening 5 is increased and consequently, in the intermediate chamber $I_C$ the internal pressure $P_I$ decreases so as to fit the above relation (1).

Similarly, the same principle applies, if a variation of the downstream pressure $P_V$ occurs: if the downstream pressure $P_V$ increases, also the internal pressure $P_I$ consequently increases, and the shutter element 6 moves to the inlet of the device 1, i.e. towards the upstream end 7. The area of the outlet opening 5 is thus increased and consequently the internal pressure $P_I$ is reduced so s to satisfy the aforesaid relation (1); if downstream pressure $P_V$ decreases, also the internal pressure $P_I$ decreases and the shutter element 6 moves towards the downstream end 8, reducing the area of the outlet section 5: this has the effect of increasing the internal pressure $P_I$ so that once again the relation (1) is fulfilled.

Figure 7:
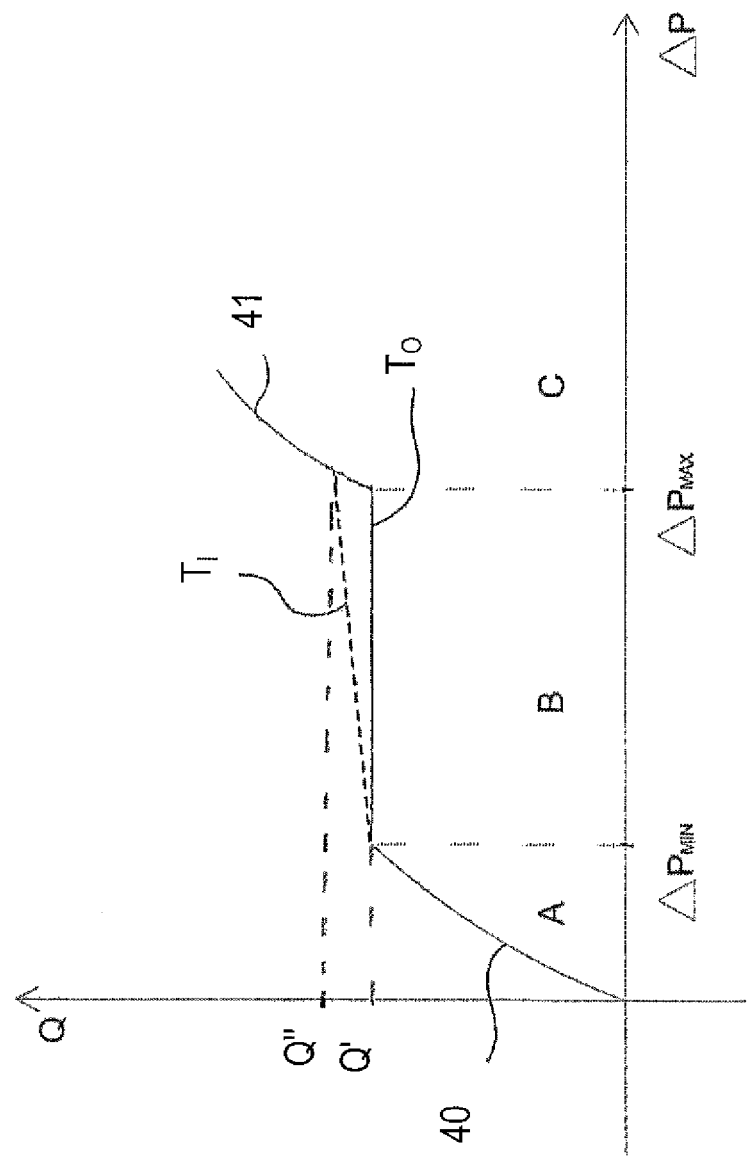
FIG. 7 is a diagram comparing the pattern of the flowrate in a known valve (dashed lines) and in a device according to the invention, with the increase of the difference between upstream pressure and internal pressure.

In the diagram in FIG. 7 the curve of the flowrate Q is shown (on the Y axis) in relation to the pressure difference $\Delta P$ (on the X axis) between the upstream zone and the intermediate chamber $I_C$, with the indication of three different operating zones A, B, C.

Zone A corresponds to an operating condition in which the pressure difference $\Delta P$ is very small, with respect to the load of the spring 11, and is thus such as not to exert any compression on the spring 11: in this manner the shutter element 6 does not suffer any movement and consequently the flowrate Q will start to increase from zero, as indicated by the portion of initial curve 40 until the pressure difference reaches the operating minimum value $\Delta P_{MIN}$.

Zone B shows the operating range of the device where the previously set out relation (1) applies.

For pressure difference values comprised between $\Delta P_{Min}$ and $\Delta P_{Max}$, the device 1 is able to control and stabilise the flowrate Q perfectly, which is fixed constantly at the precise desired value Q', as indicated by the horizontal portion $T_O$ in the diagram.

In order to understand how the device 1 is able to perform this perfect action of control and stabilisation unlike known devices, it is important to explain, with greater precision, the actual behaviour of the spring 11 and thus the actual pattern of the contrasting force $F_C$ exerted by the spring. In this manner the advantages and greater efficacy and operating precision of the present device 1 with respect to prior-art devices can be shown better.

In the above equation, the COST* parameter is not actually completely constant because the force $F_C$ exerted by the spring 11 is not constant. In fact, the force $F_C$ is directly proportional to the movement, or compression, of the spring 11.

The force $F_C$ generated by the spring 11 can vary between a minimum value—that is obtained when the pressure difference between the zone upstream of the shutter element 6 and the inner chamber has a minimum value $\Delta P_{Min}$ and the spring 11 is not compressed—and a maximum force value that is obtained when the pressure difference has a maximum value $\Delta P_{Max}$ and the spring 11 is completely compressed.

In prior-art devices this variation of the force of the spring is not taken into account (a reason for which precise constancy of the desired flowrate value Q is not ensured), whereas the device 1 of the invention is configured to take due account thereof, owing to the section-varying assembly 12, so as to ensure real constancy of the flowrate Q.

In a prior-art device, limited to the operating zone B, there is a correspondence between the flowrate Q and the pressure difference $\Delta P$ represented by a straight portion $T_I$ that is not horizontal, but tilted, having a certain tilt that depends on the geometry of the device and on the features of the spring.

The tilted portion $T_I$ grows from the value Q' until it reaches a greater value Q" at the pressure difference value $\Delta P_{Max}$.

Owing to the section-varying assembly, in particular the adjusting surface 12, the "distortion" that "non-constancy" effect of the force FC has on the previously set-out relation (1), is corrected and compensated by the variation effect of the inlet section Si exerted by the adjusting surface 12 that cooperates with the upstream wall 10 of the shutter element 6 to bound the area of the inlet section for the fluid W.

In other words, limited to the operating range B indicated above, with the growth of the pressure difference $\Delta P$, the shutter element 6 moves to compress the spring 11 that thus generates a force $F_C$ which is also increasing; at the same time, however, movement of the shutter element 6 to the downstream end 8, owing to the particular profile and lying of the adjusting surface 12, give rise to a reduction of the inlet section $S_i$, with consequent throttling of the fluid and thus stabilisation and control of the flowrate that remains constantly fixed with precision at the value Q'.

As shown by the horizontal portion $T_O$ in FIG. 7, the flowrate remains fixed at the desired value Q' until the pressure difference $\Delta P$ exceeds the limit value $\Delta P_{Max}$.

In simpler words, in the device 1, owing to the conicity of the surface 12, an inlet section Si is supplied that varies with the variation of the pressure difference $\Delta P$ according to the movement of the shutter element 6.

It is not ruled out that the adjusting surface 12, instead of being conical, can have other forms or profiles for varying the inlet section Si, so as to be able to keep account of specific geometrical/structural features of the device 1 and/or of particular mechanical features of the spring element 11.

It must be pointed out that the quality of the adjustment, i.e. the capacity and sensitivity of the shutter element 6 to react to small $\Delta P$ values (low $\Delta P_{MIN}$ values) and at the same time the possibility of being able to compensate high $\Delta P$ values (high $\Delta P_{MAX}$ values) depends on the $F_C/S_A$ ratio.

Springs with low elastic constant values must thus be used and large surfaces $S_A$ must be provided.

An elastic constant value of the spring is suitably chosen by taking into account various factors that depend on a case-by-case basis on the dimensions and geometrical shape of various parts of the device 1 (e.g. the adjusting surface, shutter element) and/or on operating parameters (e.g. flowrate, pressure) to which the device 1 is subjected.

In order to be able to have wide surfaces $S_A$ compatibly with the overall dimensions of the valve, different geometrical configurations of the shutter element 6 can be provided, in particular, different values of the surface $S_A$ of the upstream wall 10, depending on the size of the device 1, as already disclosed previously with reference to FIGS. 8 and 9, relating to a range of use with relatively low flowrate values, i.e. comprised between approximately 2 and 20 [l/min].

For ranges of use with flowrates above 20 [l/min] other solutions can be taken, as disclosed further below.

The value $\Delta P_{MAX}$ of the pressure difference $\Delta P$ is the upper limit value of the operating range of the device 1 above which it is not possible to maintain the constancy of the flowrate Q and operating zone C is entered. Upon reaching the value $\Delta P_{MAX}$, the shutter element 6 is in the maximum extent towards the downstream end 8, i.e. as near as possible to the bottom wall 17 of the cartridge body 2.

In other words, the spring 11 is in the maximum compression condition, and the outlet opening 5 is completely closed. With the increase of the parameter $\Delta P$ beyond the value $\Delta P_{MAX}$, the flowrate Q will continue to increase, as indicated by the end curve portion 41: this, despite the total closure of the outlet opening 5, is made possible by the presence of "safety passages", that in this case are represented by the gap 16 provided in the device 1, which permits a "release" of the water to the outlet from the device 1 in cases of excessive pressure upstream.

As already disclosed above, further, owing to the gap 16 a damping action is obtained to prevent hammers and a damping action of vibrations that are causable by pressure irregularities and peaks is obtained.

In the embodiments shown in FIGS. 10 and 11, further embodiments of the device 1 of greater size are shown, i.e. for use in circuits with nominal flowrate values that are greater than in the cases shown in FIGS. 1 to 6, 8 and 9. For example, the configurations shown in FIGS. 10 and 11 are suitable for use with flowrates above 80 [l/min].

More precisely, the embodiment in FIG. 11 is suitable for use with a greater flowrate Q than that of the embodiment in FIG. 10.

With FIGS. 10 and 11, for the sake of simplicity, only two possible embodiments have been shown in which it is possible to note two different configurations of the upstream wall 10 of the shutter element 6.

It is understood that further geometrical configurations of the upstream wall 10 are possible.

The embodiments of FIGS. 10 and 11 have, compared with the embodiments of device 1 disclosed previously, a different configuration of the upstream wall 10, which instead of comprising only a blind disc wall (disc wall 23), comprises an annular wall 25, and a disc wall 24 of smaller diameter than the maximum diameter of the annular wall 25.

The annular wall 25 and the disc wall 24 are spaced apart from one another, along the longitudinal axis A.

The upstream wall 10 further comprises a cylindrical wall 26 that connects the annular wall 25 and the disc wall 24 to one another.

On the cylindrical wall 26 radial inlet openings 27 are obtained that are added to the already present inlet section $S_i$ that is defined between the adjusting surface 12 of the cartridge body 2 and the lateral bounding surface 13 of the shutter element 13.

The radial inlet openings 27 enable liquid to flow inside the intermediate chamber $I_C$ by an additional flowrate value.

Also in this case, as in the embodiments of device 1 disclosed previously, control and stabilisation of the flowrate Q are made possible owing to the particular conformation of the adjusting surface 12, which is not cylindrical, as in known devices, but is conical, but can have, if necessary, also other profiles or shapes converging along the longitudinal axis A. On the other hand, the radial inlet openings 27 adapt the device 1 to the field of use that is typical of large sized devices.

In order to optimise operation of the device 1 by adapting it to ranges of use that have different nominal flowrate values it will be sufficient to set the dimensions of the annular wall 25 each time. In particular, by reducing the area of the annular wall 25 the device 1 will be made suitable for use with a greater nominal flowrate Q.

For example, as already mentioned, the device 1 shown in FIG. 11 is optimised to operate with a nominal flowrate Q that is greater than the device 1 in FIG. 10, the inlet section Si" of FIG. 11 being greater than the inlet section Si' shown in FIG. 10.

By reducing the size of the annular wall 25 from time to time, the device 1 can be configured for use with increasingly great flowrates, with incremental steps of, for example, 5 [l/min], so as to have flowrates of 85 [l/min], 90 [l/min] and so on.

In general, thus, with a device configuration such as that shown in FIG. 10 or in FIG. 11, with the same geometry and dimensions of the cartridge body 2, in addition to the possibility of intervening on the surface $S_A$ size of the upstream wall 10 to set a suitable inlet section for the fluid W, it is also possible to intervene on the number, distribution and geometry of the additional radial inlet openings 27.

Figure 13:
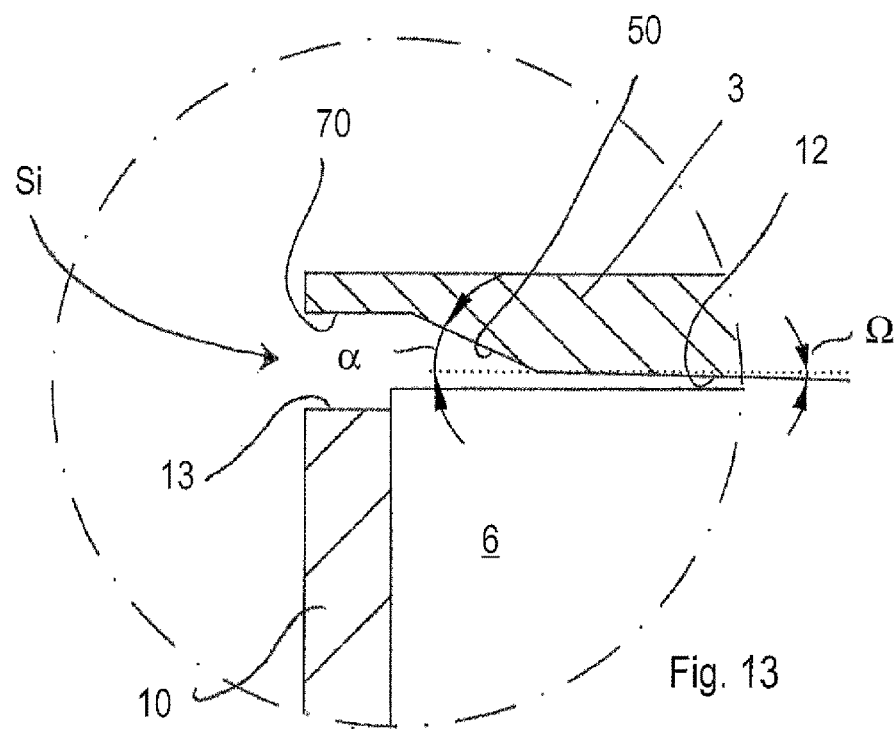
FIG. 13 is an enlarged detail of FIG. 12.
Figure 12:
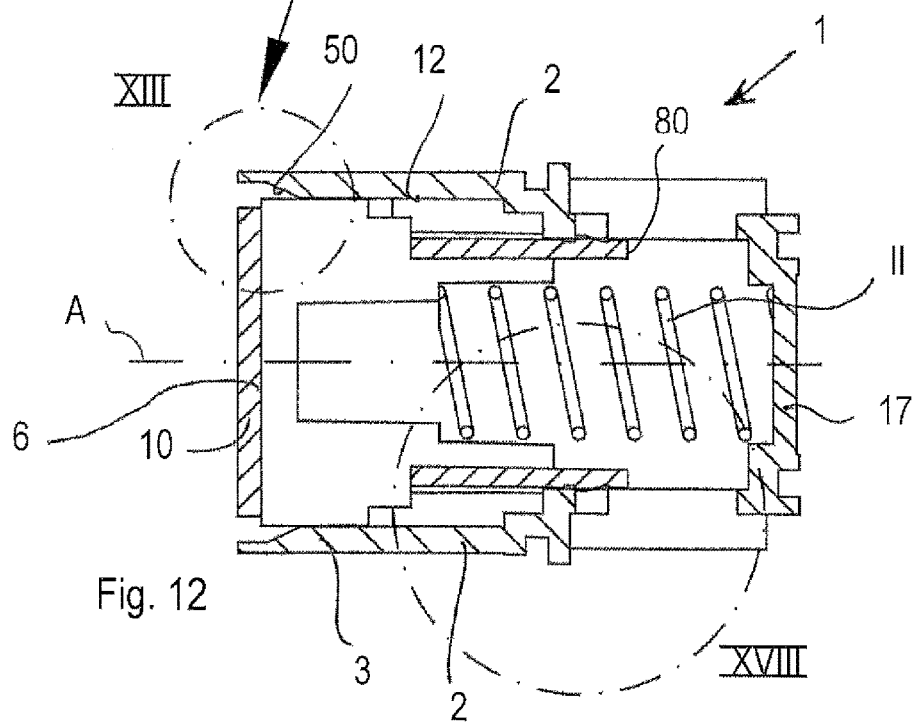
FIG. 12 is a schematic view of a further embodiment of the device according to the invention.

In FIGS. 12 to 14 a device 1 embodiment is shown that includes an improved configuration of the upstream portion 3 of the cartridge body 2, which, as specified below, enables the operating minimum temperature difference $\Delta P_{MIN}$ between upstream zone and inner zone of the cartridge body 2 to be controlled and the, relation of the flowrate Q of the fluid W according to the aforesaid operating minimum pressure difference $\Delta P_{MIN}$ to be controlled.

In FIGS. 12 and 13, the section-varying assembly includes, upstream of the aforesaid adjusting surface 12, a further adjusting surface 50 that is shaped to minimise the aforesaid operating minimum pressure difference $\Delta P_{MIN}$. The further adjusting surface 50 has an angle $\alpha$ of tilt/convergence, with respect to the longitudinal axis A, that is greater than a further angle $\Omega$ of tilt/convergence of the adjusting surface 12. By way of example, the angle $\Omega$ of tilt of the adjusting surface 12 can have values comprised between a few degrees and a few tenths of a degree, depending on the specific dimensional and geometrical configurations that are adopted on a case-by-case basis for the device 1 and/or on other factors. In particular, the further adjusting surface 50 is preceded, upstream, by a cylindrical surface 70.

The profile of the upstream portion 3 according to this version enables the performance of the device 1 to be improved. The diagram in FIG. 16 shows the optimised operation of the device 1, shown in FIG. 15, in the absence of the further adjusting surface 50. The minimum pressure difference $\Delta P_{MIN}'$ value reduction is clearly visible owing to the presence of the further adjusting surface 50 that thus extends the usable operating field with constant flowrate of the device 1. Already at very low minimum pressure difference $\Delta P_{MIN}'$ values the desired constant flowrate functioning condition at the required value is reached without the need to have to use springs 11 with excessively low elastic coefficients that would on the one hand confer great sensitivity on the device 1 to small pressure variations, but on the other hand would compromise correct operation in the normal field of operation.

In FIGS. 12 and 13 the device 1 is shown in the operating condition in which the pressure difference is at the operating minimum pressure value $\Delta P_{MIN}'$. In this condition, the shutter element 6, and thus the upstream wall 10, are in the maximum upstream position, i.e. in FIG. 12, completely to the left. In this case the inlet section $S_i$ is maximum.

In this position a sudden profile change of the upstream portion 3 of the cartridge body 2 is clearly visible. As can be intuited, as the value of the operating pressure difference $\Delta P_{MIN}$, is proportional to the ratio $Fc/S_i$, it is reduced owing to the increase of the inlet section Si obtained by the profile that is just been disclosed, in particular owing to the further adjusting surface 50.

It is briefly explained below how the various sizes of device 1 are configured according to the ranges of use associated with different nominal flowrate values.

By way of non-limiting example, referring for example to a range of flowrates from 20 to 40 L/min, the specific flowrate values can be obtained by suitably configuring the shape and position of the shutter element 6. In FIG. 14 a first shutter element 6 is shown, which is provided with an upstream wall 10 shown by a continuous line, and partially a second shutter element 6', provided with an upstream wall 10' shown by a dashed line. Both shutter elements 6, 6' are shown in the position of maximum movement to the left, corresponding to a respective operating minimum pressure difference value $\Delta P_{MIN}$. Whereas the lateral bounding surface 13 is at a distance Y from the surface 70 of the cartridge body 2, the lateral bounding surface 13 is at a distance Y' from the surface 50 of the cartridge body 2, this distance Y' being less than the aforesaid distance Y. The shutter element 6' thus defines an initial inlet section Si that is less than the initial inlet section Si of the shutter element 6 provided with a larger upstream wall 10 and positioned further upstream.

Figure 17:
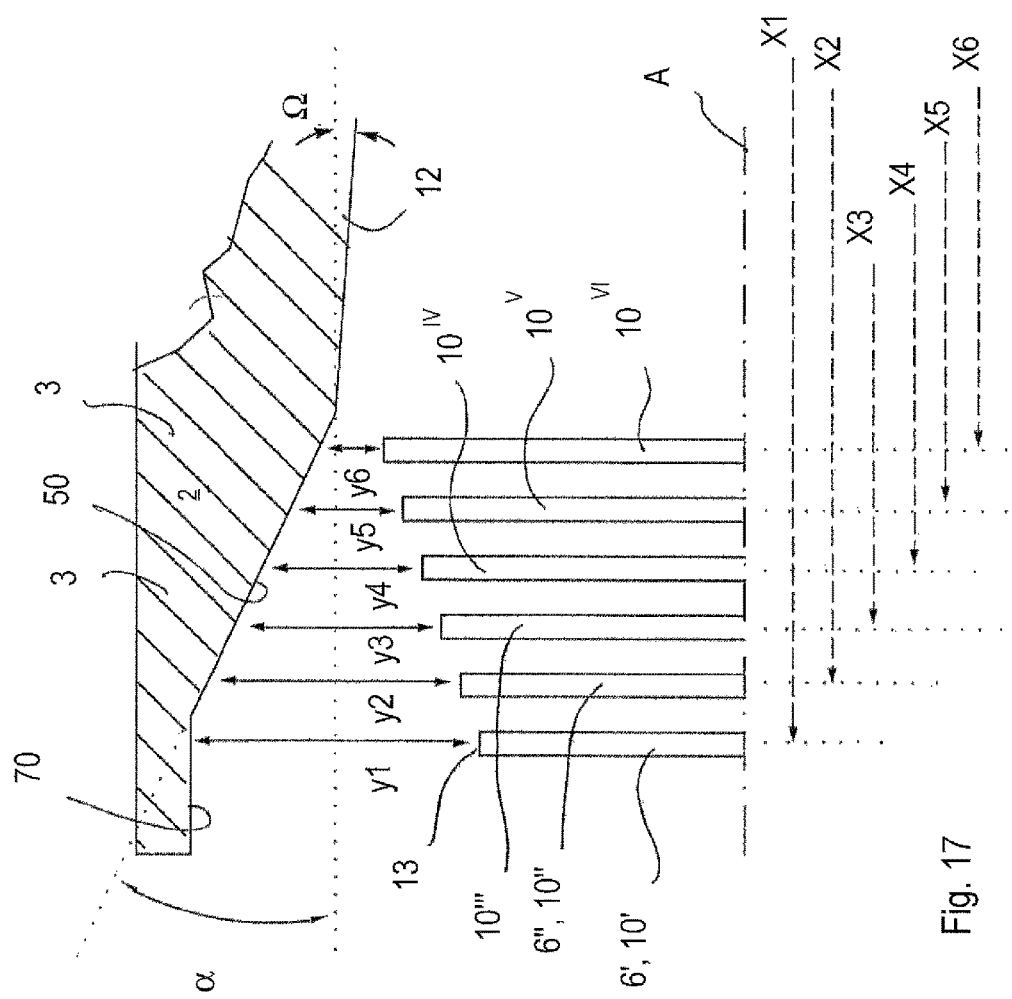
FIG. 17, with reference to the device embodiment in FIG. 12, shows schematically various possible configurations with shutter elements with a different geometrical structure and a different positioning in the cartridge body that are suitable for different respective ranges of use, i.e. different nominal flowrates.

FIG. 17 shows schematically various possible configurations with shutter elements 6 suitably configured for being optimised for respective ranges of use, i.e. for different nominal flowrates. Each of the schematised shutter elements 6', 6'', ..., 6$^{vi}$, comprises respectively an upstream wall 10', 10'', ... 10$^{vi}$ of decreasing size, i.e. such as to define increasingly decreasing inlet sections. In other words, the distances Y', Y'', ... Y$^{vi}$ that separate the respective uphill walls decrease. Correspondingly, the positions X1, X2, ... X6 adopted by the respective upstream walls 6', 6'', ... 6$^{vi}$, are moved progressively downstream. The upstream wall 10' enables the device 1 to operate with a maximum flowrate value, whereas the upstream wall 10$^{vi}$ enables the device 1 to operate with a minimum flowrate value with the same geometrical structural configuration of the cartridge body.

From what has been disclosed and shown in the attached drawings, it is clear that the invention is directed at an improved flowrate-control device 1 which has a simplified structure, which is easier to produce, and has a more effective, reliable and precise operation, in which the risks of seizures are sensibly reduced, thus achieving all the aims and advantages stated above. Further, in the light of what has been disclosed and shown, it follows that the device 1 is to be considered an automatic flowrate stabiliser that is able to maintain constant the flowrate with the varying of the conditions in which it operates, i.e. despite possible variations in inlet pressure upstream of the device 1, and/or in outlet pressure, downstream of the device 1.

What has been said and shown in the attached drawings, has been provided by way of illustration of the innovative features of the flowrate control device for fluid pressure; other modifications can be made to the entire device, or to parts thereof, without thereby falling outside the scope of the claims.

In practice, the materials, insofar as they are compatible with the specific use and with the respective single components for which they are intended, can be suitably chosen according to the required requisites and according to the available state of the art.

It is possible to configure and size the device 1 and adopt materials in the desired manner according to the multiple applications for which the device 1 can be intended, and possible variations on and/or additions to what has been disclosed and illustrated in the attached drawings.

The invention claimed is:

1. A flowrate control device for a fluid, comprising:
   a cartridge body defining a path for the fluid and having an upstream portion, for the entry of said fluid, and a downstream portion provided with an outlet opening for said fluid,
   a shutter element arranged in said cartridge body for sliding movement along a longitudinal axis between an upstream end of said cartridge body corresponding to a minimum throttling position for said fluid and a downstream end of said cartridge body corresponding to a maximum throttling position for said fluid,
   said shutter element being provided downstream with a throttling wall arranged for throttling said outlet opening in a controlled manner and with an upstream wall cooperating with said upstream portion of said cartridge body for bounding an inlet section for said fluid,
   said downstream end of said cartridge body comprising a blind bottom wall arranged transverse to said longitudinal axis and facing a downstream-edge of said throttling wall,
   said outlet opening being defined between said throttling wall and said blind bottom wall and being longitudinally positioned downstream of said shutter element,
   said shutter element and said cartridge body being configured for directing a substantial part of the entering fluid into said shutter element along said path,
   a gap being defined between said shutter element and said cartridge body for enabling passage of fluid in the event of excessive overpressure and for providing a vibration-damping action;
   said shutter element comprising one or more longitudinal ribs connecting said upstream wall to said throttling wall and having a head part radially protruding beyond said upstream wall for reinforcing, guiding and maintaining said shutter element in a correct position,
   a counter spring element suitable for exerting a contrasting force on said shutter element suitable for displacing said shutter element towards said upstream end,
   said counter spring element being housed inside said shutter element and having a first end abutting on said bottom wall of said cartridge body and a second end abutting on said upstream wall of said shutter element;
   a section-varying assembly configured for increasing or decreasing the area of said inlet section according to the variation of said contrasting force due to the movement of said shutter element along said longitudinal axis, and configured for controlling an operating minimum pressure difference between a zone upstream and a zone inside said cartridge body, and for controlling the flowrate of said fluid according to said minimum pressure difference.

2. A flowrate-control device according to claim 1, wherein said section-varying assembly is configured for reducing the area of said inlet section as the value of said contrasting force increases.

3. A flowrate-control device according to claim 1, wherein said section-varying assembly comprises an adjusting surface that is tilted with respect to said longitudinal axis.

4. A flowrate-control device according to claim 3, wherein said adjusting surface comprises a conical adjusting surface, having an internal diameter which progressively decreases according to the advancement direction of the fluid.

5. A flowrate-control device according to claim 4, wherein said conical adjusting surface is arranged on said upstream portion of said cartridge body, and wherein on said upstream wall of said shutter element there is provided a lateral bounding surface the distance of which varies from said conical adjusting surface according to the position of said shutter element along said longitudinal axis.

6. A flowrate-control device according to claim 4, wherein said conical adjusting surface bounds a frustoconical chamber having a cross-section that from a maximum value near said upstream end progressively decreases as it approaches said downstream end.

7. A flowrate-control device according to claim 3, wherein said section-varying assembly comprises upstream of said adjusting surface a further adjusting surface having an angle of tilt/convergence that is greater than a further angle of tilt/convergence of said adjusting surface.

8. A flowrate-control device according to claim 1, wherein said section-varying assembly comprises a converging-lying-adjusting surface that extends around said longitudinal axis in a manner converging towards said downstream end.

9. A flowrate-control device according to claim 1, wherein said cartridge body comprises an intermediate portion having an internal surface and interposed between said upstream portion and said downstream portion of said cartridge body slidably housing said throttling wall of said shutter element, wherein the gap is defined between said intermediate portion and said throttling wall to enable part of the fluid to pass and to perform a damping action in the event of excessive overpressure to prevent fluid hammers and damp vibrations, said gap being further shaped to vary the flowrate of a fraction of the outgoing fluid in a controlled manner.

10. A flowrate-control device according to claim 9, wherein said throttling wall is bounded externally by a control surface that comprises a first zone and a second zone having respective different external diameters with respect to one another, wherein when said first zone faces said internal surface of said intermediate portion the gap is defined having a first size, and wherein when said second zone faces said internal surface a gap is defined having a further size.

11. A flowrate-control device according to claim 10, wherein said second zone is located upstream of said first zone and has a greater external diameter than the second zone to control and reduce the passage of fluid through said gap.

12. A flowrate-control device according to claim 11, wherein said outlet opening comprises one or more radial outlet ports within said downstream portion to enable said fluid to exit radially in a distributed manner from said cartridge body.

13. A flowrate-control device according to claim 11, wherein said bottom wall, said upstream wall and said throttling wall together delimit an intermediate chamber and are arranged for being traversed by said fluid at an intermediate pressure between an upper pressure located upstream of said shutter element and a lower pressure downstream of said shutter element, and wherein said counter spring element comprises a compression spring housed in said intermediate chamber and having said first end housed in a seat obtained on said bottom wall of said cartridge-body and said second end arranged for acting on an internal zone of said upstream wall of said shutter element.

14. A flowrate-control device according to claim 11, wherein said upstream wall comprises a blind disc wall.

15. A flowrate-control device according to claim 11, wherein said upstream wall comprises a disc wall and an annular wall that are spaced apart from one another and are connected by a cylindrical wall on which radial inlet openings are provided to enable an additional liquid flowrate value to enter.

16. A flowrate-control device according to claim 11, wherein said cartridge body comprises a flange portion upstream of which an annular seat is provided housing a seal ring to prevent fluid leaks between the cartridge body and a housing body intended for receiving said cartridge body.

* * * * *